United States Patent
Patel et al.

(10) Patent No.: US 9,940,667 B2
(45) Date of Patent: Apr. 10, 2018

(54) VOLUME CONTROL FOR MASS QUOTE MESSAGES

(75) Inventors: Nimesh V. Patel, Chicago, IL (US); Joe Lobraco, Hoffman Estates, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

(21) Appl. No.: 12/969,114

(22) Filed: Dec. 15, 2010

(65) Prior Publication Data

US 2011/0082787 A1     Apr. 7, 2011

Related U.S. Application Data

(62) Division of application No. 11/856,491, filed on Sep. 17, 2007, now Pat. No. 7,899,738.

(51) Int. Cl.
*G06Q 40/00* (2012.01)
*G06Q 40/04* (2012.01)
*G06Q 40/06* (2012.01)

(52) U.S. Cl.
CPC .............. *G06Q 40/00* (2013.01); *G06Q 40/04* (2013.01); *G06Q 40/06* (2013.01)

(58) Field of Classification Search
CPC ................................. G06Q 40/00; G06F 17/60
USPC ........................ 705/1–50, 1–299; 215/1–222
See application file for complete search history.

(56) References Cited

U.S. PATENT DOCUMENTS

| | | | |
|---|---|---|---|
| 5,297,032 A * | 3/1994 | Trojan et al. | 705/37 |
| 5,557,780 A | 9/1996 | Edwards et al. | |
| 6,131,087 A * | 10/2000 | Luke et al. | 705/80 |
| 6,463,470 B1 | 10/2001 | Mohaban et al. | |
| 6,466,944 B1 | 10/2002 | Stokes | |
| 7,124,110 B1 | 10/2006 | Kemp, II et al. | |
| 2002/0004774 A1 | 1/2002 | Defarlo | |
| 2004/0103191 A1 | 5/2004 | Larsson | |
| 2005/0096999 A1* | 5/2005 | Newell et al. | 705/26 |
| 2007/0118453 A1 | 5/2007 | Bauerschmidt et al. | |

OTHER PUBLICATIONS

International Search Report from PCT/US04/37238 dated Jun. 13, 2008, 3 pages.
PCT International Search Report, PCT/US08/76346, dated Nov. 24, 2008, 10 pages.
PCT International Preliminary Report on Patentability, PCT/US2008/076346, dated Apr. 1, 2010, 9 pages.
Larry L. Peterson & Bruce S. Davis, "Computer Networks a Systems Approach", ISBN 1-55860-368-9, 1996, 25 pages.
Jan. 30, 2015—(CA) Office Action—App 2,699,754—5 pages.

* cited by examiner

*Primary Examiner* — Clifford Madamba
(74) *Attorney, Agent, or Firm* — Banner & Witcoff, Ltd.

(57) ABSTRACT

Systems and methods are provided for processing mass quote messages and generating market data. A mass quote message is received and individual orders are parsed and processed. Individual market data messages are stored in a market data message buffer. After all orders are processed, the contents of the market data message buffer is distributed as a single market data message.

14 Claims, 5 Drawing Sheets

VOLUME CONTROL FOR MASS QUOTE MESSAGES

This application is a divisional of U.S. patent application Ser. No. 11/856,491 entitled, "Volume Control for Mass Quote Messages," filed Sep. 17, 2007, which is incorporated by reference herein in its entirety.

RELATED APPLICATIONS

Commonly-assigned U.S. patent application Ser. No. 10/982,535, U.S. patent application Ser. No. 10/903,826, and U.S. provisional patent application Ser. No. 60/517,491, which are all incorporated by reference herein in their entirety, describe an example of a mass quote message, formats for such mass quote messages, and an example of a system for processing such mass quote messages.

FIELD OF THE DISCLOSURE

Aspects of the present invention relate to mass quote messages. More specifically, aspects of the present invention provide systems and methods for controlling the rate of processing mass quote messages.

BACKGROUND

Current financial instrument trading systems allow traders to combine orders for a group of financial instruments into a single order called a mass quote message. For example, a trader or trading entity may use a mass quote message when transmitting orders for a group of related option contracts, such as an option series belonging to one option class. With conventional trade engines, each individual order is processed separately and results in the creation of market data. The market data produced for each trade is then distributed to traders and other entities.

As the number of orders and traders increases, the distribution of market data messages can strain processing resources, bandwidth, and networks that are used to transmit such messages. The processing of numerous market data messages and associated overhead consumes bandwidth and processing time. Therefore, there is a need in the art for improved systems and methods for regulating the receipt and/or processing of mass quote messages and producing and/or distributing market data messages.

SUMMARY OF THE DISCLOSURE

The present invention overcomes at least some of the problems and limitations of the prior art by providing systems and methods for controlling the rate of acceptance of mass quote messages. The mass quote messages may be formatted in one or more of the formats known to one skilled in the art.

In one example, a method is disclosed for determining if the consumption value of mass quote messages and/or quotes exceeds predetermined thresholds during a predetermined interval of time. If the threshold is met or exceeded, then messages that fall within a subsequent predetermined window, such as messages received with a defined time period, may be rejected. An indication of non-compliance (e.g., a rejection message such as defined in the Financial Information eXchange FIX Protocol) with the threshold setting may be sent if a violation is detected. Meanwhile, if the threshold settings are not found to be violated, then messages may be accepted for processing. A mass quote counter and/or a quote counter may be used to monitor the quantity of each message received during an interval of time. The counters may be reset when a message is received outside the predetermined window. As such the consumption value may be calculated using various techniques.

Furthermore, a trading terminal in accordance with aspects of the disclosure may send mass quote messages to an exchange or other system for processing. The trading terminal may receive an indication that a threshold has not been complied with, and thus, is in non-compliance.

Moreover, a system in accordance with aspects of the disclosure may include a lockout variable configured to indicate whether incoming messages should be rejected or accepted for processing. The system may also include a quote counter and mass quote counter. New quotes and mass quote messages may be received at an order receiving module at an exchange or other system. Meanwhile, a window determination module, consumption calculation module, and compliance verification module may be included in such a system to perform one or more features of the system.

Of course, the methods and systems disclosed herein may also include other additional elements, steps, computer-executable instructions, or computer-readable data structures. In various embodiments, aspects of the present disclosure can be partially or wholly implemented on a computer-readable medium, for example, by storing computer-executable instructions or modules, or by utilizing computer-readable data structures.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention may take physical form in certain parts and steps, embodiments of which will be described in detail in the following description and illustrated in the accompanying drawings that form a part hereof, wherein.

DETAILED DESCRIPTION

Aspects of volume controls may be used to limit the rate at which customers can submit mass quotes messages, such as orders submitted to an electronic trade matching engine associated with a financial exchange. A large number of mass quotes may impact the operating efficiency of trading engines and the engines' responsiveness. Aspects of volume controls may be used to ease bandwidth and processing constraints on trading engines and other exchange infrastructure/systems. At least one benefit of aspects of the disclosure is that it allows an exchange to provide a more stable and reliable market. In conjunction with aspects of the disclosure, an exchange, or any entity that provides a marketplace for processing orders, may upgrade other infrastructure, such as iLink and market data platform (MDP) systems, to further enhance the system.

In accordance with aspects of the disclosure, systems and methods are disclosed for measuring the number of quotes per second (QPS) for each session (e.g., an Think session or other session) with mass quote messaging capabilities. The QPS may be measured during a predetermined time interval. For a trading session, the number of mass quotes for a period of time, or QPS, may be limited. A trading firm may be identified by or associated with a trading session. Thus, the number of quotes that a trading firm may submit for a period of time may be limited by limiting the QPS for the trading session. If a trading firm exceeds their allotted QPS as measured over the predetermined time interval, subsequent mass quote messages from that trading firm (or trading terminals) may be rejected during the next time interval. However, some message types (e.g., mass quote Cancel by Instrument, by Group, and Cancel All) may not be subjected to such restrictions and may be permitted even while other message types are being rejected. Aspects of volume controls may use the number of quote entries in a mass quote received per second to perform various calculations. An exchange (or other entity) may set and communicate to its trading firms the measurement thresholds and QPS limits per session (or other interval of time).

Figure 1:
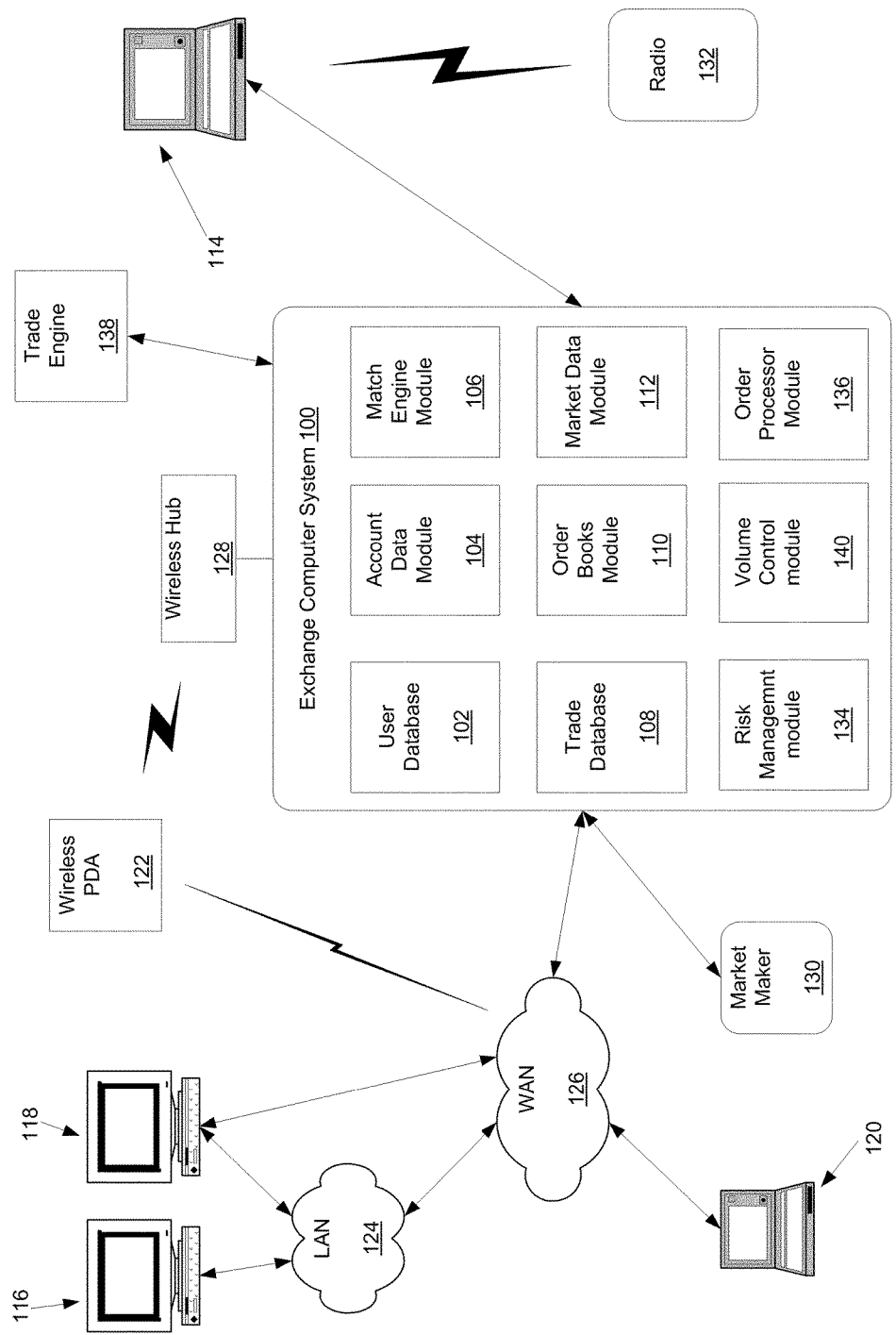
FIG. 1 depicts an illustrative computer network system that may be used to implement aspects of the present invention.

Aspects of the present invention are preferably implemented with computer devices and computer networks that allow users to exchange trading information. An exemplary trading network environment for implementing trading systems and methods is shown in FIG. 1. An exchange computer system 100 receives orders and transmits market data related to orders and trades to users. Exchange computer system 100 may be implemented with one or more mainframe, desktop or other computers. A user database 102 includes information identifying traders and other users of exchange computer system 100. Data may include user names and passwords. An account data module 104 may process account information that may be used during trades. A match engine module 106 is included to match bid and offer prices. Match engine module 106 may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by order book module 110 and match engine module 106.) A volume control module 140 may be included to, among other things, control the rate of acceptance of mass quote messages in accordance with one or more aspects of the disclosure.

The trading network environment shown in FIG. 1 includes computer devices 114, 116, 118, 120 and 122. Each computer device includes a central processor that controls the overall operation of the computer and a system bus that connects the central processor to one or more conventional components, such as a network card or modem. Each computer device may also include a variety of interface units and drives for reading and writing data or files. Depending on the type of computer device, a user can interact with the computer with a keyboard, pointing device, microphone, pen device or other input device.

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

One or more market makers 130 may maintain a market by providing constant bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on computer-readable medium. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Figure 2:
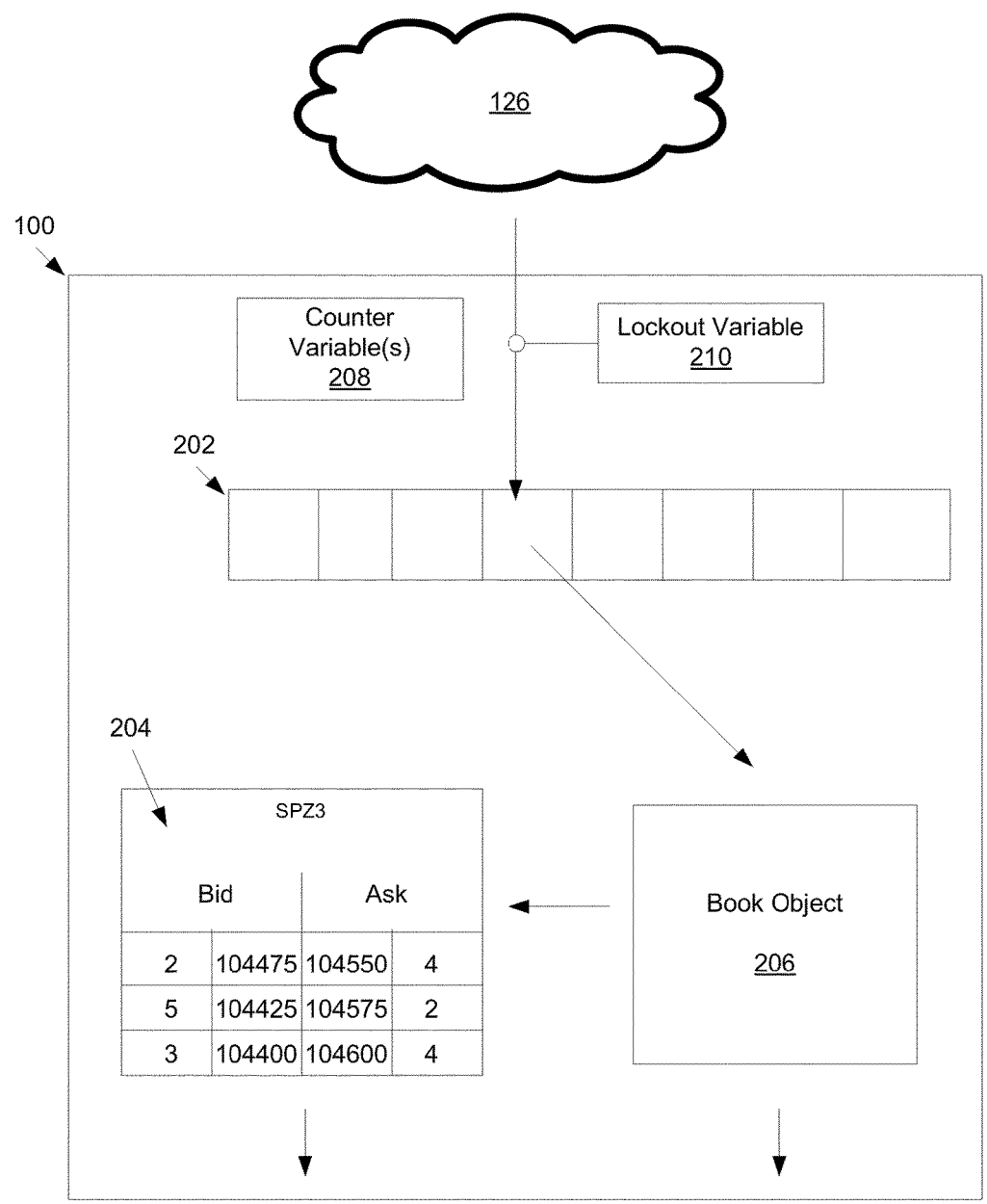
FIG. 2 illustrates an illustrative system for processing mass quote messages and a distributing corresponding market data in accordance with an embodiment of the invention.
Figure 3:
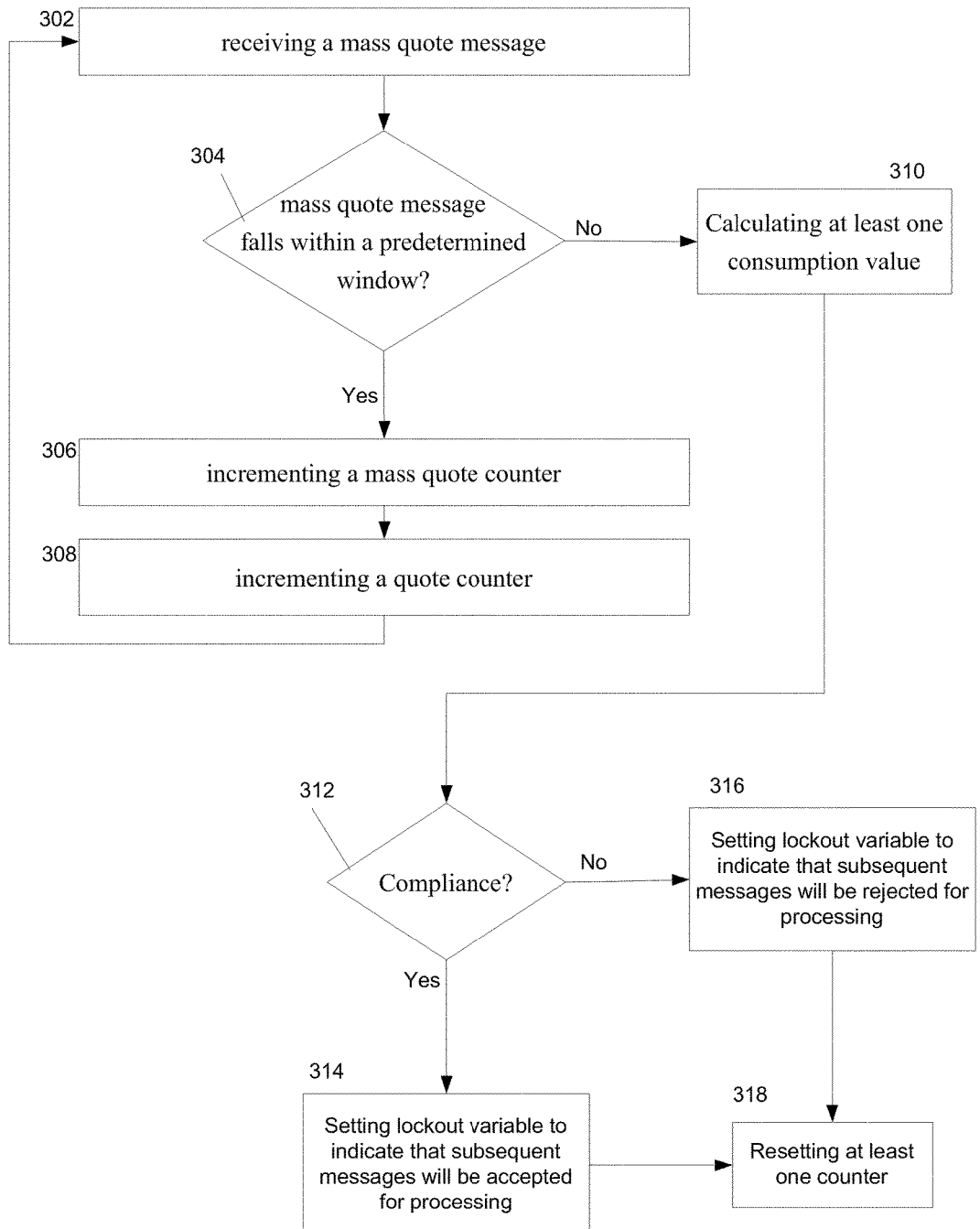
FIG. 3 illustrates an illustrative computer implemented method for processing mass quote messages in accordance with an embodiment of the invention.

FIG. 2 illustrates an example of aspects of a system 100 for receiving and processing mass quote messages in accordance with an embodiment of the invention (see step 302 in FIG. 3). A mass quote message 202 may contain a plurality of orders for at least one financial instrument. The mass quote message 202 may also be associated with a session. A session may be associated with a unique session identifier. The identifier may be assigned to a trading entity for a trading period. The trading entity may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one embodiment of the invention, the orders are for options contracts that belong to a common option class. Orders may also be for baskets, quadrants, other combinations of financial instruments, etc. The option contracts may have a plurality of strike prices and/or comprise put and call contracts. Mass quote message 202 may be received at an exchange. As used herein, an exchange 100 includes a place or system that receives and/or executes orders.

The orders in mass quote message 202 are delivered to appropriate order book objects 206. Each order book object 206 may correspond to a particular financial instrument, such as an option contract and may track or maintain the order book for that financial instrument. Furthermore, the top level bids or asks (see 204) for a particular financial instrument (e.g., SPZ3) may be gathered using the order book object 206.

In accordance with aspects of the invention, one or more counter variables 208 may be used to track the quantity of mass quote messages and/or quotes that are received. A mass quote counter (e.g., counter variable 208) may be incremented for each mass quote message received within a predetermined window of time (see step 306 in FIG. 3). Similarly, a quote counter (e.g., counter variable 208) may be incremented for each quote in each mass quote message received within a predetermined window of time (see step 308 in FIG. 3). For example, if a mass quote message is received comprising one hundred quotes, then the mass quote counter may be incremented by one and the quote counter may be incremented by one hundred. In some embodiments in accordance with aspects of the invention, the mass quote message may comprise two-sided quotes, one-sided quotes, and/or a combination of the aforementioned. In some implementations, the counter variable 208 may default to one-sided quotes, unless otherwise specified.

Figure 4:
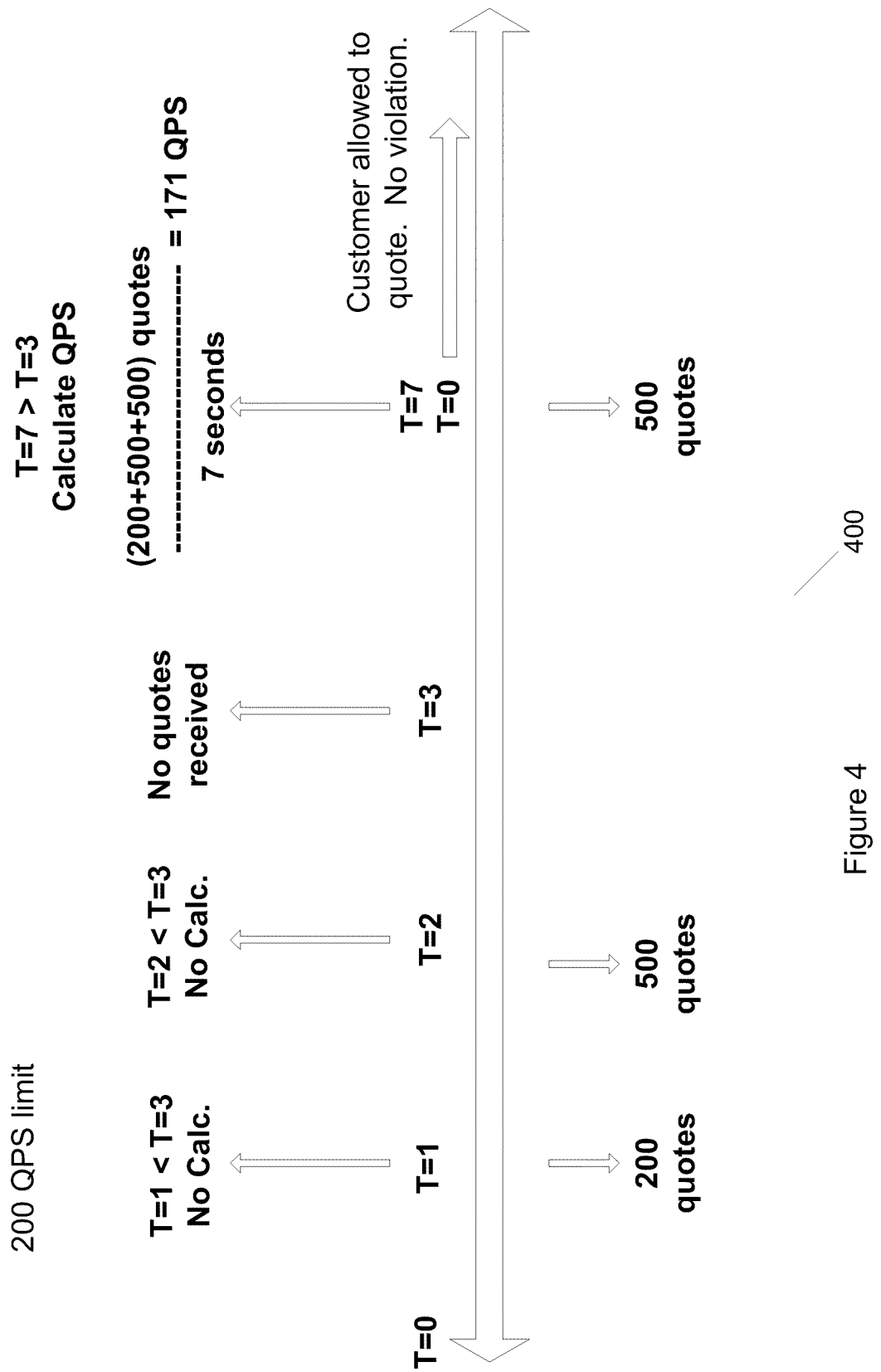
FIG. 4 illustrates a timeline of events in a method of processing mass quote message in accordance with an embodiment of the invention.
Figure 5:
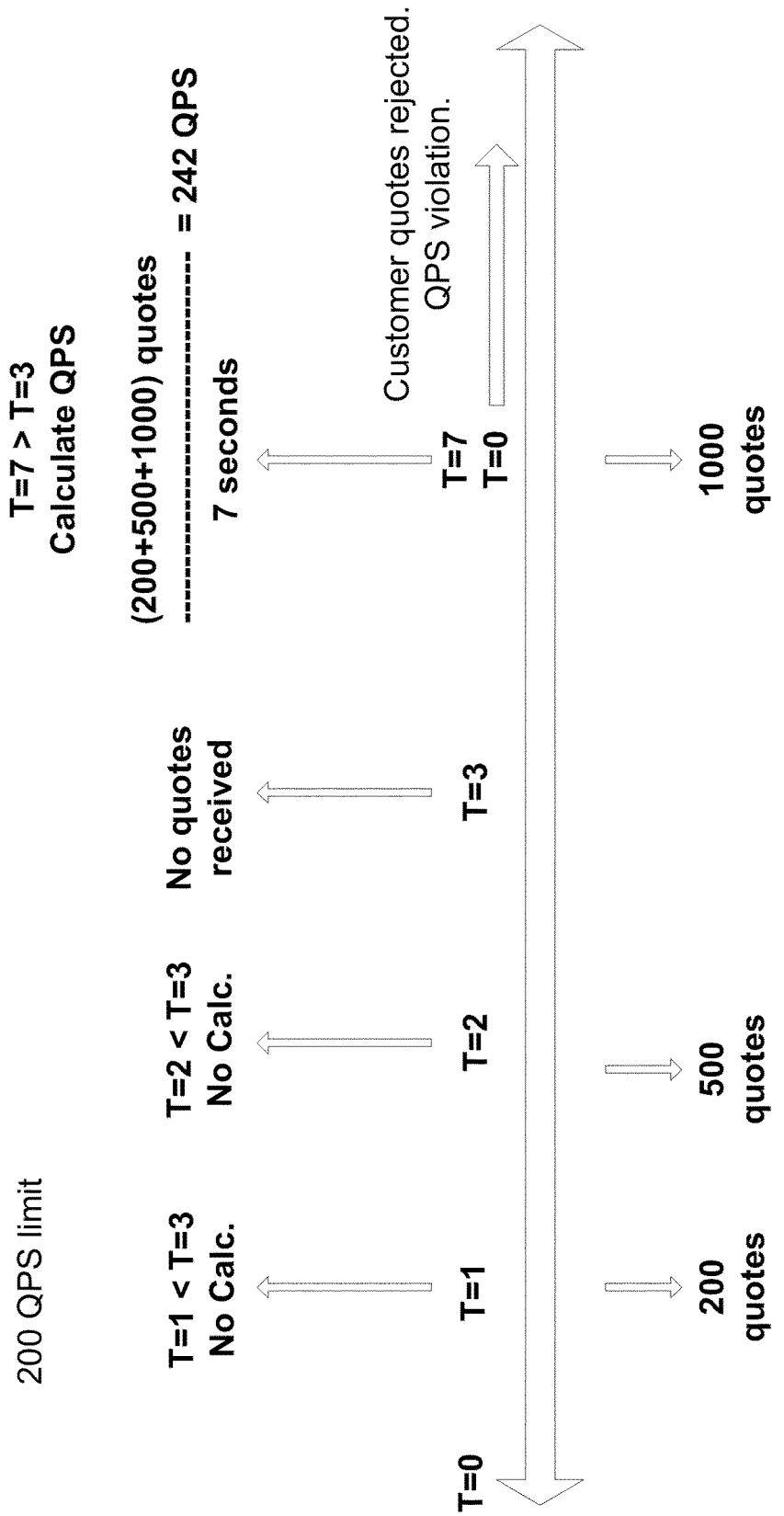
FIG. 5 illustrates another timeline of events in a method of processing mass quote message in accordance with an embodiment of the invention.

In one embodiment in accordance with aspects of the invention, a timestamp value of the received message (e.g., retrieved from a header of a mass quote message) may be retrieved and used to determine a consumption value (see step 310 in FIG. 3). Such a consumption value may be calculated by dividing the total number of quotes received by the elapsed time. The elapsed time (e.g., predetermined window) may be determined by comparing the time a first message was received with the time a subsequent message is received. Alternatively, a timestamp value in the received messages may be used. If the time interval is greater than a predetermined window size (e.g., three seconds), then a consumption value may be calculated using the collected statistics. Thus, the consumption value may be calculated when the elapsed time is greater than a predetermined window. For example, FIG. 4 and FIG. 5 illustrate two examples of the calculation of a consumption value for a predetermined window size of three seconds. For example, if ten seconds elapse between messages, then the consumption value is calculated by dividing by ten. Furthermore, a separate consumption value may be calculated for the total number of mass quote messages received during a predetermined window.

One skilled in the art will appreciate that in such embodiments where a timestamp value is used to determine consumption value, the actual window size used to calculate a consumption value may be greater than a predetermined window. In such instances, the actual window size is the predetermined window for the purposes of calculating the consumption value.

In another embodiment in accordance with aspects of the invention, a timer component may be used to monitor the completion of a predetermined window (e.g., a 3-second window). In such an embodiment, the system 100 must may include clock hardware to serve as a stopwatch in monitoring the predetermined window. At the completion of each predetermined window, the counter variables 208 may be reset to zero so that a new consumption value may be calculated separately for each predetermined window. One skilled in the art will appreciate that there are various drawbacks and advantages to a timer component system versus a timestamp value system as described, and vice-versa.

Regardless of which system (e.g., timer component system, timestamp value system, or combination) is implemented, the consumption value may be compared to a predetermined threshold to determine if the value is in compliance (see step 312 in FIG. 3). For example, as shown in FIG. 4 and FIG. 5, a threshold value of two hundred quotes per second may be used. If the consumption value exceeds this predetermined threshold value, then a lockout variable 210 may be set (e.g., flagged with a value of binary '1') to indicate that mass quote messages that fall within a subsequent predetermined window (i.e., the next three second window) will be rejected for processing by the system 100 (see step 314 in FIG. 3). Meanwhile, the consumption value may be calculated for this subsequent predetermined window to determine how many mass quote messages and/or quotes are continuing to be received at the system 100. If the consumption value then complies with the predetermined threshold, then the lockout variable 210 may be cleared (e.g., flagged with a value of binary '0') to indicated that mass quote message that are subsequently received will be accepted for further processing (e.g., sent to the matching engine 106, book object 206, and various other modules) by the system 100 (see step 316 in FIG. 3).

If the consumption value for a window is determined to be in non-compliance, then an indication of non-compliance may be sent to the system and/or terminal (e.g., 116, 118, 120) transmitting the mass quote message. The indication of non-compliance may be in the form of a predetermined packet type (e.g., a rejection FIX packet message) that contains header information (e.g., a code corresponding to a violation type) that is understood by the receiving system/terminal to mean that the system 100 is rejecting incoming messages (e.g., mass quote, etc.) for a predetermined window due to non-compliance. The trading terminal (e.g., 116, 118, 120, etc.) receiving the indication of non-compliance may be alerted that the message submitted has been rejected, and that messages it sends to an exchange 100 for a predetermined window of time may also be rejected.

FIG. 3 illustrates a computer implemented method for processing mass quote messages in accordance with an embodiment of the invention. First, in step 302 a mass quote message is received by an order receiving module in exchange computer system 100. The mass quote message includes a plurality of orders for financial instruments and may be received at an exchange 100, match engine or any other location or device that processes orders for financial instruments. In step 304 a window determination module determines, as explained throughout, whether a mass quote message falls within a predetermined window and increments (in step 306 and 308) the mass quote counter and quote counter accordingly. The counters are incremented while the incoming messages fall within a predetermined window (e.g., 3 seconds). Once an incoming message is received outside a predetermined window, the consumption calculation module may be used to calculate (in step 310) one or more consumption values. Such consumption values may be associated with the quantity of mass quotes and/or the quantity of quotes. Alternatively or in addition, the consumption calculation module may continuously (or on a predetermined interval) calculate an interim consumption value. In such an embodiment, a non-compliance that is evident from the start of an interval may be identified and the appropriate module may react appropriately (e.g., by setting a lockout variable).

In accordance with aspects of the volume controls, a compliance verification module may compare the consumption value/values and determine if a predetermined threshold for QPS has been exceeded. If so, the lockout variable 210 is set (in step 314 or 316) to the appropriate value. Subsequent incoming messages may be accepted or rejected accordingly. Moreover, some predetermined types of message (e.g., a cancel all message type) may be excluded from regulation by the compliance verification module. Finally, in step 318, the counters 208 may be reset so that the next predetermined window of time may be monitored and consumption calculated.

One skilled in the art will appreciate that one or more modules described herein may be implemented using, among other things, a tangible computer-readable medium comprising computer-executable instructions (e.g., executable software code). Alternatively, modules may be implemented as software code, firmware code, hardware, and/or a combination of the aforementioned. For example the modules may be embodied as part of an exchange 100 for financial instruments.

The embodiments described above utilize a mass quote message. In alternative embodiments individual orders may be processed and produce market data that is compiled into a single market data message. A variety of criteria may be used to group orders that produce market data that is ultimately compiled into a single market data message. For example, orders received within a predetermined time period or orders for similar financial instruments received within a predetermined time period may be grouped together such that the resulting market data is transmitted within a single market data message.

The embodiments described above also transmit a single market data message after all orders have been processed. In alternative embodiments of the invention a market data message may be transmitted before all of the orders are processed. For example, the message may be transmitted at a predetermined time after receiving market data from the first order. This allows market data to be distributed even when the processing of one or more orders takes an undue length of time. After a first market data message is transmitted, subsequent market data messages may be transmitted upon receipt of additional market data.

Referring to FIG. 4 and FIG. 5, for every mass quote received, a system calculates the time difference between the current message (Tx) and the first message received at the start of the time interval (T0) and verifies whether the difference is greater than or equal to a predetermined interval of time (such as three seconds or any other defined and/or adjustable time interval for capturing or measuring QPS limits). If the time difference is less than the predetermined interval of time, there is no action taken to limit volume control by the present invention, and the system may continue to accept mass quote messages. If the time difference is greater than the predefined time interval, the system may take the count of the number of messages received from T0 to Tx and averages that over the time interval. If the average QPS calculated exceeds the allowed QPS, the triggering quote and future incoming quotes are rejected for at least the next three seconds. If the average QPS calculated does not exceed the allowed QPS, customers are allowed to continue quoting and the process continues and the timer is reset to T0. In an event-driven implementation of the disclosure, the system waits for a message to arrive, at which point it performs the calculation mentioned above. The system may initially check for the greater than or equal to three second time interval. If the criteria is met, an average QPS calculation may be performed and the quote message is sent through only if the QPS level is below the set threshold. If a customer (e.g., trading entity) continues to exceed the threshold level, even during the reject period, quotes are rejected again for at least the next three seconds. The timer is reset as T0 every time a message received is beyond the three second interval verification period. FIG. 4 and FIG. 5 are just two examples based on the minimum three second lockout.

For example, during a minimum three second lockout: (1) quote messages may receive a session level reject message, however the system may continue to accept customer cancel messages. The system may also continue to count the quotes received in this period. However, at T=3 or after (based on when the next message is received), the system may calculate the quotes received so far and their average, and check them against the allowable QPS limit. If the customer is within the limit, the reject restriction is lifted and they are allowed to quote. If the customer is outside the QPS limit, quotes are rejected for another three second minimum. In accordance with aspects of the disclosure, the rejection message may specify whether the quote was rejected due to the number of mass quote messages or the number of quotes in a mass quote message. In some embodiments, the error message may include text (or some other identifier) to explain the reason for rejection.

The present invention has been described in terms of preferred and exemplary embodiments thereof. Numerous other embodiments, modifications and variations within the scope and spirit of the invention will occur to persons of ordinary skill in the art from a review of this disclosure. For example, aspects of the invention may be used to process and communicate data other than market data.

We claim:
1. A method, comprising:
receiving, by an order receiving module of a mass quote message server, a mass quote message sent over a computer network, wherein the mass quote message comprises a plurality of quotes for at least one financial instrument;
determining, by a window determination module of the mass quote message server, whether the mass quote message falls within the predetermined window and incrementing a quote counter of the mass quote message server accordingly;

calculating, by a consumption calculation module of the mass quote message server, a first consumption value using the quote counter;

setting a lockout variable of a compliance verification module of the mass quote message server to indicate that mass quote messages subsequently received by the order receiving module will be rejected for processing in response to the first consumption value failing to comply with a first threshold; and generating and sending, by the mass quote message server, a non-compliance message over the computer network, in response to the lockout variable of the compliance verification module being set to indicate rejection of subsequently received mass quote messages.

2. The method of claim 1, where the non-compliance message comprises a rejection message containing a code corresponding to a violation type.

3. The method of claim 1, where a trading entity with a plurality of trading terminals communicates with the computer over the computer network using a unique session identifier, and where the unique session identifier is associated with the mass quote message.

4. The method of claim 1, where the mass quote message falls within a predetermined window of time if the mass quote message comprises a timestamp value that falls within the predetermined window.

5. The method of claim 1, where the mass quote message falls within a predetermined window of time if the mass quote message is received before a timer expires, the timer corresponding to a size of the predetermined window.

6. An apparatus comprising a processor configured to execute computer-executable instructions and computer memory storing the computer-executable instructions, which when executed by the processor, cause the apparatus to perform steps comprising:

receiving, by an order receiving module of the apparatus, a mass quote message sent over a computer network, wherein the mass quote message comprises a plurality of quotes for at least one financial instrument;

determining, by a window determination module of the apparatus, whether the mass quote message falls within the predetermined window and incrementing a quote counter of the apparatus accordingly;

a consumption calculation module configured to calculating, by a consumption calculation module of the apparatus, a first consumption value using the quote counter;

setting a lockout variable of a compliance verification module of the apparatus to indicate that mass quote messages subsequently received by the order receiving module will be rejected for processing in response to the first consumption value failing to comply with a first threshold; and generating and sending, by the apparatus, a non-compliance message over the computer network, in response to the lockout variable of the compliance verification module being set to indicate rejection of subsequently received mass quote messages.

7. The apparatus of claim 6, where the non-compliance message comprises a rejection message containing a code corresponding to a violation type.

8. The apparatus of claim 6, where the mass quote message falls within a predetermined window of time if the mass quote message comprises a timestamp value that falls within the predetermined window.

9. The apparatus of claim 6, where the mass quote message falls within a predetermined window of time if the mass quote message is received before a timer expires, the timer corresponding to a size of the predetermined window.

10. A non-transitory tangible computer-readable storage medium storing computer-executable instructions, which when executed by a processor, cause an apparatus to perform steps comprising:

receiving, by an order receiving module of the apparatus, a mass quote message sent over a computer network, wherein the mass quote message comprises a plurality of quotes for at least one financial instrument;

determining, by a window determination module of the apparatus, whether the mass quote message falls within the predetermined window and incrementing a quote counter of the apparatus accordingly;

a consumption calculation module configured to calculating, by a consumption calculation module of the apparatus, a first consumption value using the quote counter;

setting a lockout variable of a compliance verification module of the apparatus to indicate that mass quote messages subsequently received by the order receiving module will be rejected for processing in response to the first consumption value failing to comply with a first threshold; and generating and sending, by the apparatus, a non-compliance message over the computer network, in response to the lockout variable of the compliance verification module being set to indicate rejection of subsequently received mass quote messages.

11. The computer-readable medium of claim 10, where the non-compliance message comprises a rejection message containing a code corresponding to a violation type.

12. The computer-readable medium of claim 10, where a trading entity with a plurality of trading terminals communicates with the computer using a unique session identifier, and where the unique session identifier is associated with the mass quote message.

13. The computer-readable medium of claim 10, where the mass quote message falls within a predetermined window of time if the mass quote message comprises a timestamp value that falls within the predetermined window.

14. The computer-readable medium of claim 10, where the mass quote message falls within a predetermined window of time if the mass quote message is received before a timer expires, the timer corresponding to a size of the predetermined window.

* * * * *